United States Patent [19]
Parker

[11] Patent Number: 5,105,094
[45] Date of Patent: Apr. 14, 1992

[54] METHOD AND APPARATUS FOR CONVERTING WAVE MOTION INTO AN ALTERNATIVE ENERGY SOURCE

[76] Inventor: Percy C. Parker, 7019 Waring Ave., Hollywood, Calif. 90038

[21] Appl. No.: 665,657

[22] Filed: Mar. 7, 1991

[51] Int. Cl.⁵ .................... F03B 13/12; F03B 13/22
[52] U.S. Cl. .................................. 290/53; 290/42; 290/43; 290/54
[58] Field of Search .............. 290/42, 43, 53, 54

[56] References Cited

U.S. PATENT DOCUMENTS

| | | | |
|---|---|---|---|
| 3,668,412 | 6/1972 | Vrana et al. | 290/53 |
| 4,001,597 | 1/1977 | Graff | 290/53 |
| 4,145,885 | 3/1979 | Solell | 290/53 |

FOREIGN PATENT DOCUMENTS

| | | | |
|---|---|---|---|
| 2459379 | 2/1981 | France | 290/53 |
| 1195031 | 11/1985 | U.S.S.R. | 290/53 |

Primary Examiner—A. D. Pellinen
Assistant Examiner—Robert L. Hoover
Attorney, Agent, or Firm—Ladas & Parry

[57] ABSTRACT

An apparatus for converting the energy contained in the wave motion of a body of water to alternate forms of energy. The apparatus comprises a main water pipeline, a water inlet for directing water into the main water pipeline from a plurality of water inlet positions along a path in the direction of wave propagation. A vertical water flow riser is connected to, and receives water from, one end of the main water pipeline. The flow riser includes a cylinder and sealed piston arrangement, the piston movable upwardly in the cylinder responsive to the positive pressure of incoming water beneath the piston, and movable downwardly in the cylinder under the influence of gravity acting on the cylinder and on the water in the cylinder beneath the piston. A drain is provided for allowing a regulated amount of water to drain from the main pipeline on the downward stroke of the piston. The piston is coupled to an energy conversion means for producing an alternate energy output on both the upward and downward strokes of the piston.

20 Claims, 4 Drawing Sheets

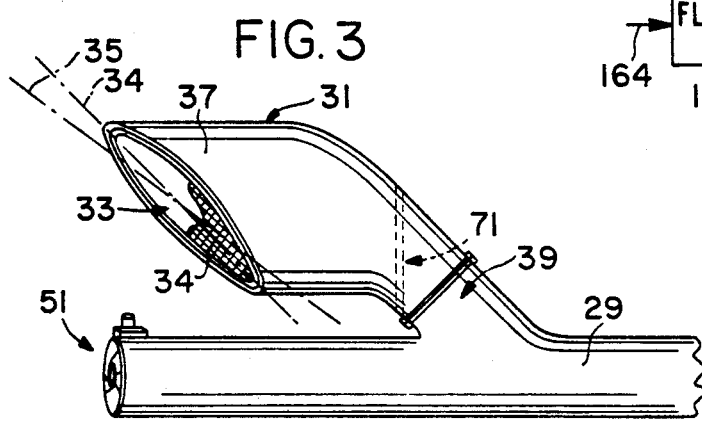
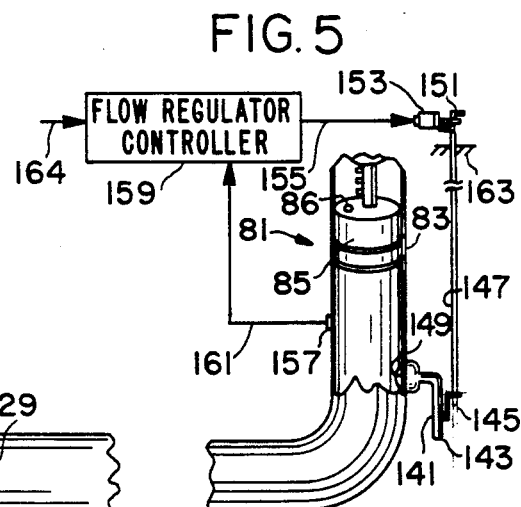
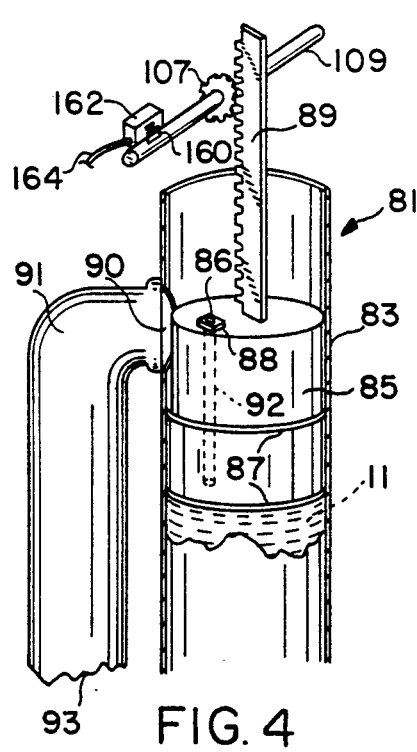
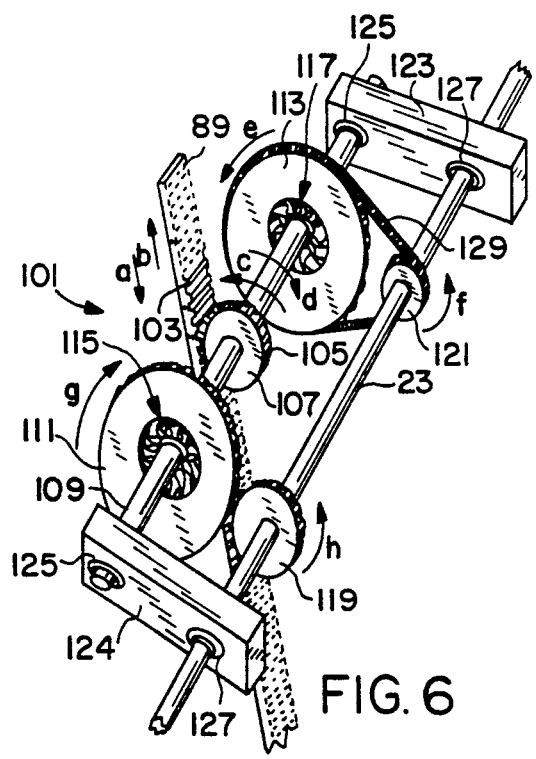

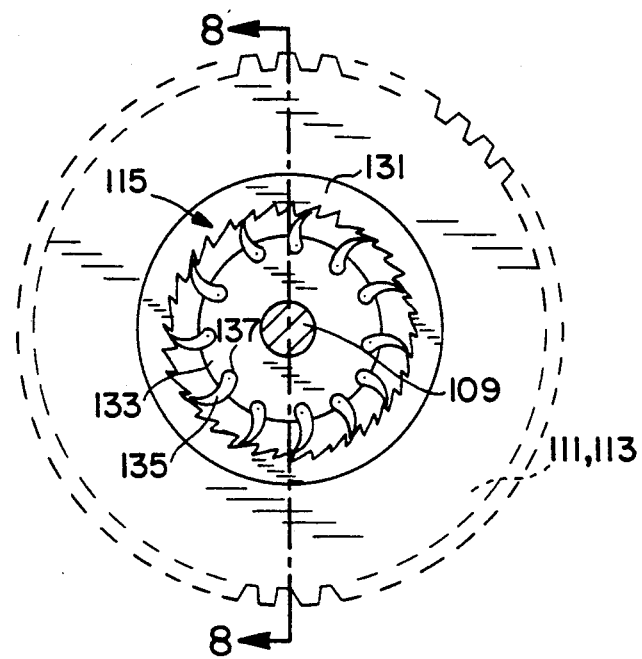
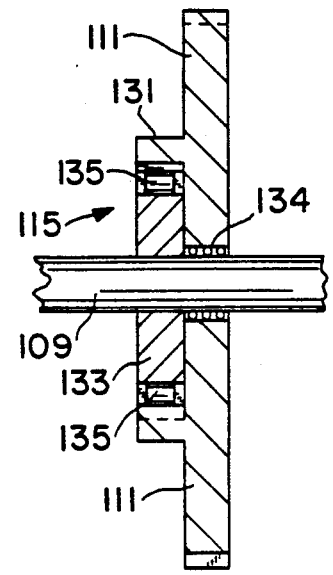
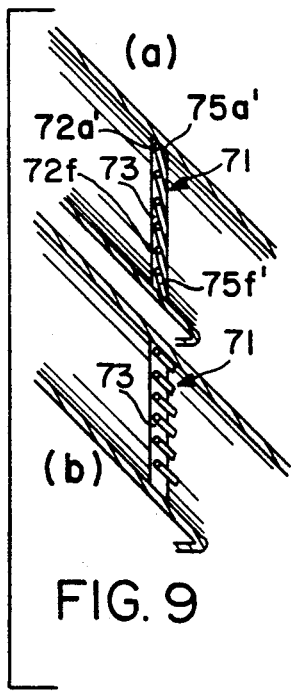
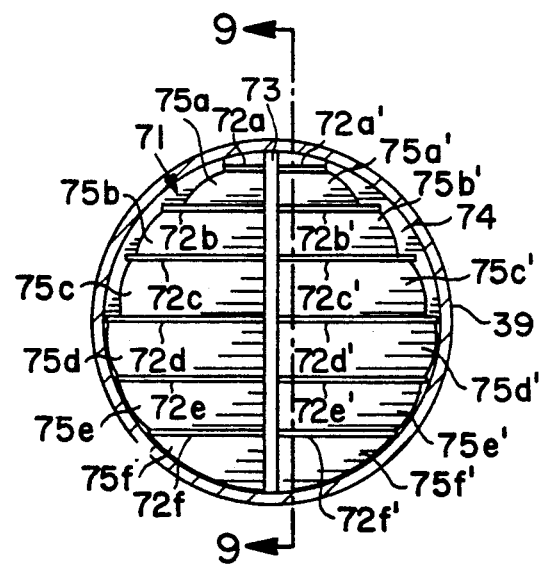

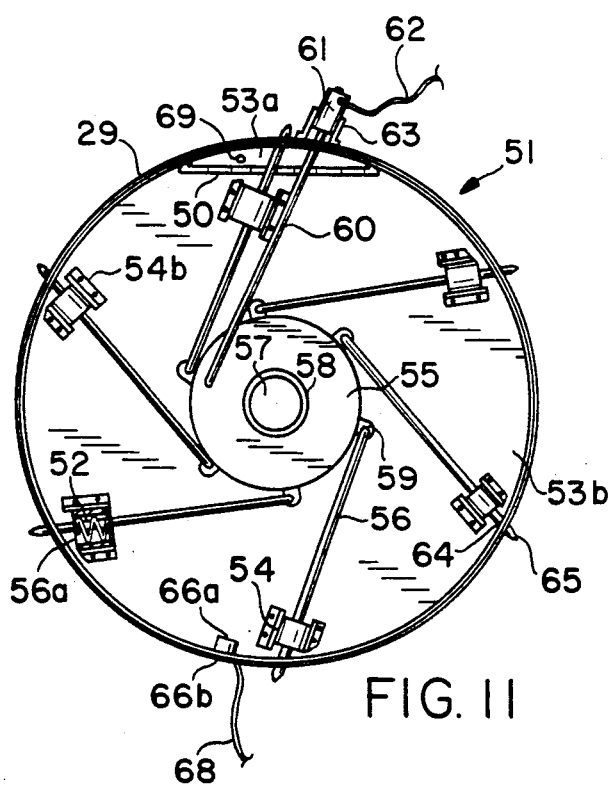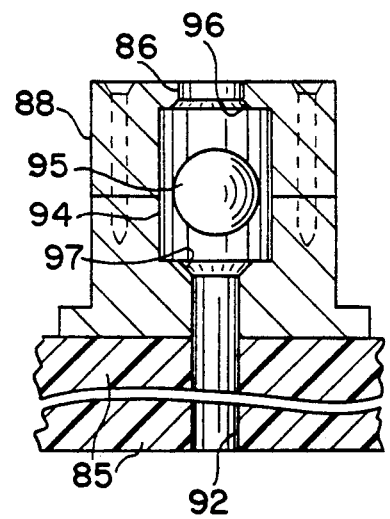
FIG. 11
FIG. 12

METHOD AND APPARATUS FOR CONVERTING WAVE MOTION INTO AN ALTERNATIVE ENERGY SOURCE

BACKGROUND OF THE INVENTION

1. Field of the Invention

This invention relates to the field of energy conversion, and more particularly to a method and apparatus for converting the wave motion in a body of water to an alternative energy source such as electrical energy.

2. Brief Description of the Prior Art

There have been many attempts at harnessing the massive energy in the waves of the sea. However, such attempts have either made use of extremely complicated apparatuses, have used light weight float mechanisms to directly convert the up and down movement of the float into an alternate energy source thereby requiring a large number of floats and associated float mechanisms, or have been inadequate in the amount of energy produced to make the construction of the apparatus economically feasible.

One such prior art apparatus can be found in U.S. Pat. No. 4,145,885 to Solell. Solell describes a wave motor comprising a float, a displaceable member coupled to the float so as to be displaced by the ascent and descent of the float. A transmission is then operated directly by the movement of the float to rotate an output drive shaft which may be connected to an electrical generator, a pump, or any other device for utilizing or storing the mechanical energy produced by the wave motor.

Another U.S. Pat. No. 4,260,901 to Woodbridge shows a system for converting mechanical energy in the wave motion of a body of water into electrical energy, wherein a floatation element is buoyantly supported by the water and constrained to follow only the vertical component of the wave motion. The motion of the floatation element is transferred to an electrical generating device which produces electricity directly by the motion between a flux-producing device and the electrical coil of a generator. In Woodbridge, a cylindrical water column is utilized, but only to support the float which is not sealed relative to the cylindrical housing, but rather has a "clearance fit" within the internal void of the cylinder.

Another float/cylinder arrangement is shown in Vrana et al., U.S. Pat. No. 3,668,412. The Vrana et al. apparatus is based upon the principle of a large float which exerts force upwardly at a time of a risen tide and downwardly due to gravity at a time of a fallen tide, with the energy being converted to a rotatable horizontal shaft for driving an electrical generator while performing other useful work, the energy in the float being released at low tide after being stored from the rising of the float during the high tide condition.

The buoy motor of Weills, U.S. Pat. No. 2,871,790, also uses a buoy which moves upwardly and downwardly within cylindrical units as the waves move them upwardly and allow them to fall, providing waterfalls operable on a turbine connected to a generator for generating power through the operation of motors.

Donatelli, U.S. Pat. No. 3,746,875, teaches a power plant operable to generate electrical energy both from the up and down movement of the ocean's surface by means of a floatation platform slidably connected with a structure fixed to the ocean floor. Electricity is generated from a mechanism driven by the up and down movement of the platform and from other mechanisms in the form of paddle wheels driven by the flow of water directed across the platform.

Another wave-operated generator system which utilizes a flotation means for coupling the vertical movement of waves to an electrical generator is found in U.S. Pat. No. 4,392,060 to Ivy. Ivy shows a particular arrangement of a rack and pinion assembly for use as a transmission for converting the wave motion to mechanical energy in the form of a rotation of a shaft.

Other patents dealing with the subject of converting wave motion to electrical energy, but not as pertinent as those described specifically above, include the following U.S. Pat. Nos.: 4,476,396 to Calvert, Jr.; 3,697,764 to Spanziola, et al.; 3,898,471 to Schera, Jr.; 3,930,168 to Tornabene; 3,964,264 to Tornabene; 4,009,395 to Long et al.; 4,268,757 to Rogers; 4,281,257 to Testa et al.; 4,454,429 to Buonome; 4,490,621 to Watabe et al.; 4,560,884 to Whittecar; 4,622,473 to Curry; 4,599,858 to LaStella et al.; and 4,739,182 to Kanderi.

Several of the above-mentioned patents combine the output from a plurality of floatation means by some kind of a transmission device for each of the floatation means operating on a common output shaft. However, at any one floatation location, the amount of energy that is removable from the wave motion of the sea is solely dependent upon the size of the individual floatation means, and it is only through the transmission devices that the accumulation of energy is produced. It would be an improvement in such systems if the energy from a plurality of locations in the sea were to act on a single floatation means and if such system included a further plurality of such floatation means for producing substantially more energy output from the overall system.

Another deficiency of the prior art lies in the fact that each of the floatation means depends upon the buoyancy and weight of the float element itself. The larger and heavier the float element is, the greater the downward force for operating the electrical generator due to gravity acting on the float element. However, when a heavy float element is used, a great deal of energy is required by the ocean to buoy the heavy weighted float element upwardly. It would be a substantial improvement in the efficiency of the system if the weight of the water itself which causes the float element to rise is calculated in the total amount of energy that is obtainable by the system as the wave falls. That is, in prior art systems, the greatest captured energy occurs when the float element is being pushed up by the wave motion of the sea, but very little energy is captured when the floatation element falls of its own weight. The amount of energy due to the weight of the water dropping is thus wasted in such systems for all practical purposes.

SUMMARY OF THE INVENTION

The present invention overcomes the aforementioned deficiencies of prior art wave-motion energy converters. In its simplest form, the invention embodies an apparatus for converting the energy exhibited by the propagation of wave motion in a body of water to alternate forms of energy, such apparatus comprising: a main water pipeline; water inlet means for directing water into the main water pipeline; a vertical water flow riser connected to, and receiving water from, one end of the main water pipeline, the flow riser including a cylinder and a piston movable upwardly in the cylinder responsive to the positive pressure of incoming water beneath the piston and movable downwardly in the cylinder under the influence of gravity acting on the cylinder and on the water in the cylinder beneath the piston; drain means for allowing a relatively small amount of water to drain from the main pipeline on the downward stroke of the piston; and energy conversion means coupled to the piston for producing an alternate energy output.

In a preferred embodiment, the apparatus utilizes both: a plurality of water inlet positions along the path of an incoming wave to act in combination with a single vertical column flow riser (cylinder/piston) arrangement; and a plurality of such vertical flow riser arrangements to rotate a common shaft for producing a tremendous amount of output energy. The present invention makes full use of the weight of the water that pushes the piston upwardly by providing a sealed cylinder construction for the piston and cylinder, such that the piston is pushed upwardly by the incoming wave and is pulled downwardly in the cylinder when the wave falls. No other prior art system operates in this manner.

In accordance with another aspect of the invention, there is provided an apparatus for converting the energy exhibited by the propagation of wave motion in a body of water to alternate forms of energy, which apparatus comprises a main water pipeline, a water inlet for directing water into the main water pipeline from a plurality of water inlet positions along a path in the direction of wave propagation, a vertical water flow riser connected to, and receiving water from, one end of the main water pipeline and including a cylinder and sealed piston arrangement, the piston movable upwardly in the cylinder responsive to the positive pressure of incoming water beneath the piston, and movable downwardly in the cylinder under the influence of gravity acting on the cylinder and on the water in the cylinder beneath the piston. A drain/flow-regulator is provided for allowing a regulated amount of water to drain from the main pipeline on the downward stroke of the piston. The piston is coupled to an energy conversion means for producing an alternate energy output on both the upward and downward strokes of the piston.

The water inlet means preferably comprises a plurality of enlarged water entrances one at each of a plurality of positions along the path of wave propagation and each being in fluid communication with the main water pipeline.

A check valve is provided in each of the water entrances for permitting water to enter the water entrance and be communicated to the main water pipeline when the water pressure at that entrance is high due to an overhead wave, and for checking water which tends to flow from the main water pipeline toward the entrance when the wave has moved on down the path of wave propagation.

The drain/flow-regulator means is located below the lowest level reached by the piston in the main water pipeline, and the amount of water which can pass through the drain/flow-regulator is small in comparison with the amount of water that enters the water entrances and pushes the piston upwardly in the vertical flow riser. In this manner, after the wave has passed each water inlet entrance, the water will begin to drain from the pipeline and cause the piston to be pulled down as the water beneath the piston seeks the new lower level of water in the sea. By designing the drain opening to be a specific size relative to the size of the main pipeline and that of the water inlet entrances, and knowing the typical time between waves in a particular location in which the invention is utilized, the piston in the cylinder will, on the average, fall at precisely the correct rate such that by the time it reaches the bottom of its stroke, the next wave comes along to the next water inlet entrance and forces water into the main pipeline, and the cycle starts over again.

For the purposes of this discussion, it will be assumed that it is always advisable to regulate the amount of water being drained. Therefore, henceforth the drain/flow-regulator will be referred to simply as a flow regulator, although a calculated fixed size drain would suffice in some applications. The flow regulator is located at the bottom of the flow riser and well beneath the piston and is provided for permitting a controlled amount of water to exit the vertical flow riser on the downward stroke of the piston. Thus, when conditions demand it, manual or automatic regulation of the flow is provided by the flow regulator. For example, in a more turbulent sea condition, it may be desirable to rotate the shaft of an electrical generator at a higher rate of speed, since more energy is available in the more active wave motion. In such a case, the flow regulator can open the drain to allow additional water to exit on the downward stroke of the piston, because the next wave coming in will arrive sooner than average, or the amount of water accumulated beneath the piston is greater than average, or both, and the system can obviously be operated more efficiently. The flow regulator can be manually operated or automatically operated by the provision of a pressure sensor which will be explained later.

In the condition just described, where the ocean or sea is highly active, and especially if this occurs at high tide, it is possible for the amount of water entering the system to be excessive such that the piston is driven higher and higher in the vertical flow riser cylinder and the maximum flow out of the flow regulator is not sufficient to discharge the amount of water being accumulated in the vertical flow riser. In such a case, mechanical damage to the system could occur. To prevent this, an overflow outlet is provided to discharge water beneath the piston when the bottom of the piston rises above a prescribed level.

As mentioned, in a preferred embodiment of the invention, a plurality of main water pipelines are provided, each with its own vertical flow riser at the shore side of the main water pipeline. A plurality of transmission means each coupled to a corresponding flow riser piston converts the up and down movement of each of the pistons into the rotation of a drive shaft which is used as an input driving source to the energy conversion means, preferably an electrical generator.

The invention also embodies a unique transmission employing a rack and pinion arrangement. Specially arranged ratchet devices are utilized in the transmission for permitting the use of a single rack mounted to the top of a piston in each flow riser, a single pinion gear rotatable by the rack, and yet provide positive output shaft rotation for both the upward and downward movement of the piston/rack.

On a timed schedule, clean-out of the system will be required. For that purpose, a clean-out means is provided in the form of an end plate covering the end of each main water pipeline remote from the flow riser. A hinge arrangement allows the end plate to swing from a closed position to an open position. Remote control means secure the end plate into position during normal operation and permit the end plate to swing open precisely at the proper time and under the proper conditions to permit water to flow out of the main water pipeline in reverse direction through the clean-out end of the pipeline.

BRIEF DESCRIPTION OF THE DRAWING

The invention will now be described in connection with the accompanying drawings in which:

FIG. 3 shows the construction of a water inlet entrance;

FIG. 4 is a partial cross sectional view of a vertical flow riser illustrating the position of the piston, rack, pinion gear, and overflow outlet;

FIG. 5 shows a vertical flow riser in partial cross section and the arrangement of a flow regulator used therewith;

FIG. 6 shows the construction of the transmission at each flow riser location;

FIG. 7 depicts one of the drive gear ratchet arrangements;

FIG. 8 is a cross sectional view of the drive gear ratchet taken along the lines 8—8 in FIG. 7;

FIG. 9 show schematically (not to scale) the arrangement of a flapper check valve in the neck portion of a water inlet in both the closed and the open positions, FIG. 9 being a section taken along the lines 9—9 in FIG. 10;

FIG. 10 is a view looking down the neck of a water inlet entrance showing the flapper check valve arrangement;

FIG. 11 shows the end of a main water pipeline and the construction which permits the end of the pipeline to be opened for clean-out; and FIG. 12 shows a cross-sectional view of the vent through the cylinder.

DETAILED DESCRIPTION OF THE PREFERRED EMBODIMENTS

Figure 1:
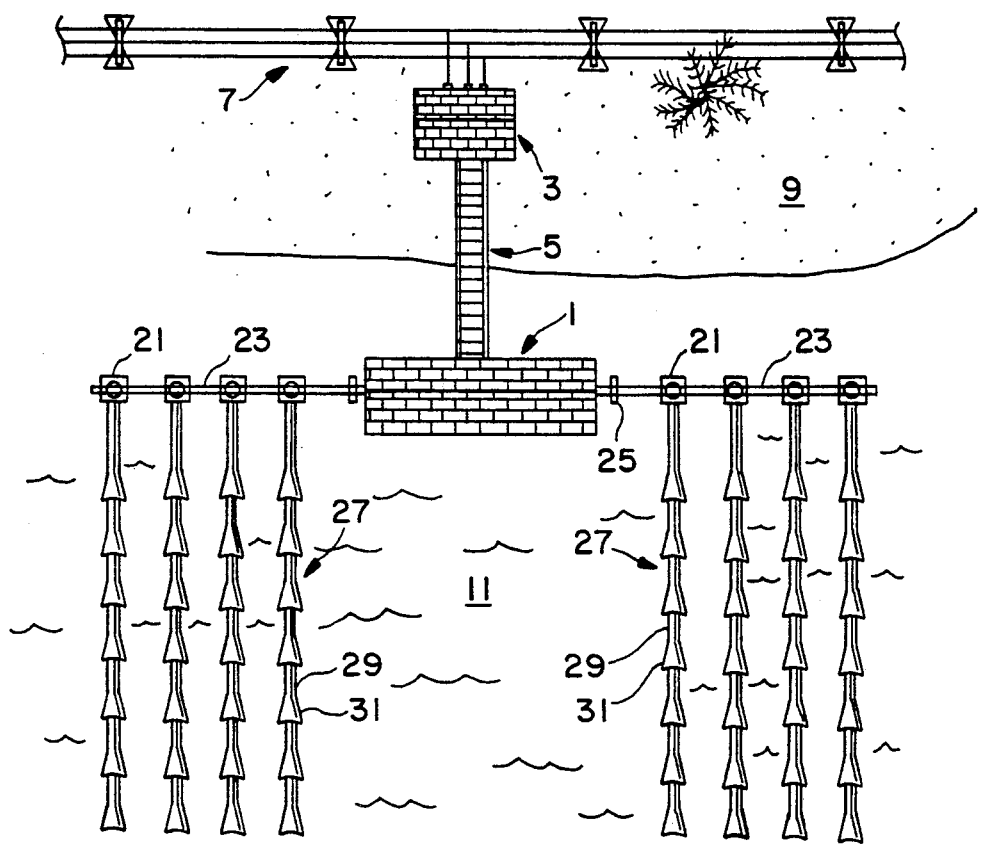
FIG. 1 shows one of a number of possible physical arrangements of the system in accordance with the present invention.

The concepts of the present invention can be beneficially utilized in a variety of physical arrangements of a wave-motion/electrical generation system. FIG. 1 shows merely one example of a specific arrangement in which an electrical generator 1 is positioned offshore in the body of water 11 and supplies electrical energy to a power distribution unit 3 on beach/shore 9 by means of a conduit/walkway 5. The electrical energy from the power distribution unit 3 is then transmitted over electrical transmission line 7 to its end users.

The electrical generator is of known design and construction and is situated on a platform above the highest water level of the sea 11. Generator 1 is coupled to a plurality of working units 21 by means of a common generator drive shaft 23. To maintain a substantially non-dynamic angular rotation for the drive shaft 23, flywheels 25 on either side of the electrical generator 1 are beneficially employed.

Each working unit 21 is supplied with a head of water by means of a pipeline assembly 27. Each pipeline assembly 27 incorporates a main water pipeline 29 with a plurality of water inlets 31 spaced therealong. As will be seen, wave propagation, which in the arrangement of FIG. 1 is toward the shore 9, forces water into the water inlets 31 in sequential order, and all water inlets 31 direct the incoming water through the main water pipeline 29 to its associated working unit 21.

It would be obvious to make use of a different, but equally effective physical arrangement, such as facing the water inlets angularly to the shore, instead of at right angles to it, in locations where the direction of wave propagation is typically angularly oriented. Yet another alternative arrangement would be to position the electrical generator 1 in the water 11 at a substantial distance from the shore 9 and arrange the pipeline assemblies 27 so as to have four such assemblies extending seaward from the electrical generator and in front of it, and a second group of four pipeline assemblies 27, also facing seawardly but located between the electrical generator 1 and the shore 9. It should therefore be understood that the actual geometrical arrangement of the pipeline assemblies 27, working units 21, and electrical generator 1 is a matter of choice for each individual set of circumstances and location. Similarly, the number of water inlets 31 and the number of working units 21 are a matter of choice depending on need and capabilities which are limited by the sea activity at the area.

Figure 2:
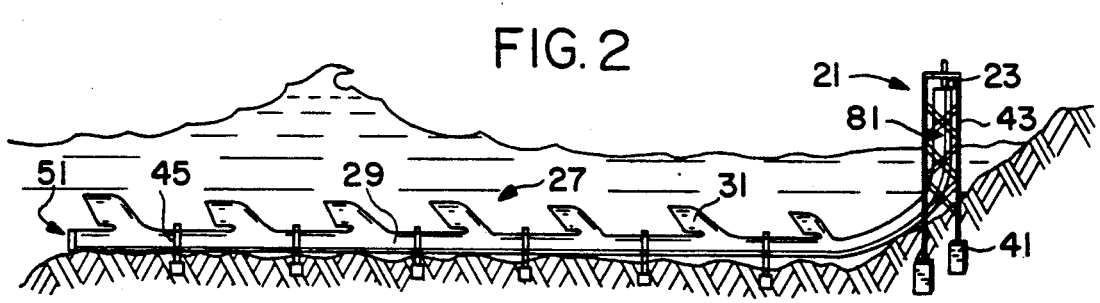
FIG. 2 shows a single main water pipeline with a plurality of entrances and a flow riser near the shore.

In FIG. 2, a single pipeline assembly 27 is shown. Here, the working unit 21 is in the form of a tower having tower structural supports 43 anchored in the ground by cement footings or pylons 41. The main water pipeline 29 is held relatively parallel by support struts 45 of any known construction. The end 51 of the pipeline 29 is the location for the clean-out arrangement to be discussed later.

Each water inlet 31 faces seawardly, and as can be appreciated by reference to the wave depicted in FIG. 2, the direction of wave propagation in the example to be discussed herein is toward the shore, such that the water entering inlets 31 forces water upwardly into a vertical column flow riser 81.

At this point, a brief discussion of one of the physical principles upon which the invention is based will now be discussed. In FIG. 2, it will be appreciated that if the level of the water was constant (no waves), and assuming that all of the air in the pipeline assembly 27 has been ejected, the water in vertical flow riser 81 would be at the same level as the body of water, since water seeks its own level in a static system. Thus, the water level in flow riser 81 would be exactly the same as the level in the sea. Next, assume a wave enters from left to right and is above the first (leftmost) water inlet 31. If all of the other water inlets 31 were closed off, for the moment of time the wave is above the first water inlet it would cause water to enter the inlet since the pressure above the inlet is greater than that in the pipeline 29. It would be the same as if the water level were again constant but at a higher level than before, in which case the water in flow riser 81 would rise to meet the new level of the sea. This explanation is by way of example only, since the sea is obviously a dynamic entity, but the explanation is the same, i.e., as the wave passes each inlet 31, it tends to push water into that inlet and into pipeline 29 to cause the water in vertical column flow riser 81 to rise until such time as the water in flow riser 81 is indeed equal to the highest peak of the incoming wave. This explanation assumes that the water inlet 31 below the wave is the only one open at the time and all of the others are closed. This is precisely what take place in the arrangement according to the invention as will be understood as this description continues. With the basic idea of the invention understood, the remainder of this description illustrates a preferred embodiment of the various working parts.

FIG. 3 shows one of the water inlets 31 in more detail. An entrance 33 is preferably oval shaped and is about thirty feet wide by thirty-five feet high and about three to ten times the area of the main water pipeline 29 which is preferably ten feet in diameter. The entrance housing 37 thus reduces down to a neck portion 39 so as to cause the flow of water to smoothly enter the main water pipeline 29 at the exit of the neck portion 39. All water inlet entrances 33 should be covered with one-half inch stainless steel screening to keep all large fish and vegetation out of the pipeline. The entrances 33 (and, if desired, neck portions 39) of the water inlets 31 furthest out to sea are tilted at a forty-five degree angle as shown by the line 34 in FIG. 3. This appears to be the optimum angle to force maximum water into the main water pipeline 29. The closer to the shore the wave gets, the faster it moves, and therefore when it reaches approximately halfway to the working unit 21, the entrances 33 (and, if desired, neck portions 39) are tilted more than forty-five degrees to approximately fifty degrees as shown by the line 35 in FIG. 3. Thus, advantage is taken of the fact that the speed of the wave increases nearer the shore and as a result of the increased angle of attack on the incoming wave, more water will enter the main water pipeline 29 than before. As will be evident from FIG. 2, the outer three water inlets 31 are tilted at a lesser angle than those of the inner four water inlets 31 for this reason.

FIG. 3 also shows the position of a check valve 71 and the basic components at the end 51 of pipeline 29, all to be discussed later in connection with FIGS. 9-11.

The vertical column flow riser 81 is best seen in FIG. 4 showing the cylinder 83 in cross section and a piston 85 with seals 87, thereby not only confining the piston 85 to within cylinder 83, but also keeping the relationship watertight so as not to permit any water to get by the piston 85. Because of this sealing relationship, the water 11 pushes piston 85 upwardly independent of whether or not piston 85 is in fact lighter than water, unlike the floatation elements of the prior art. Of course, it is preferable that piston 85 be lighter than water, but it is important to note that the piston according to the present invention can be made as strong as desired without affecting the operation of the apparatus. If it were limited in construction to lightweight plastic material of low structural integrity, the size of the components required in accordance with the invention may not provide adequate output energy. The seals 87 serve yet another, synergistic purpose, in that when the wave motion ceases and the water level in the flow riser 81 begins to drop, the piston 85 is pulled down with the level of the water, and the invention thus operates the rack on the downstroke, not only by the gravity acting upon piston 85, but also upon the massive amount of water 11 beneath the sealed piston 85.

At the initial startup of a newly installed system, or from time to time as needed, it is necessary to vent all of the air from the main water pipeline 29 up to the bottom of the piston 85. For that purpose an aperture 92 extends through the piston 85 leading to a gas vent valve 88 which vents air only (not water) through a vent hole 86.

In the event that the water in cylinder 83 would exceed maximum permissible limits, the piston 85 would rise to a level such that water 11 would exit an overflow opening 90 and be returned to the sea through an overflow outlet pipe 91 having an exit end 93 in a safe location.

FIG. 4 also shows the basic arrangement of a rack 89 and a pinion gear 107, the latter being fixed to and turning a pinion shaft 109. For purposes which will be understood later, a magnet 160 may be physically attached to the pinion shaft 109 and a magnetic sensor 162 will then provide electrical pulses on line 164 as a measurement of the angular velocity of the rotating pinion shaft 109. Essentially, the pulsing on line 64 is representative of the angular velocity of the pinion shaft and, of course, if an electrical generator is later utilized, also an indication of the rate of rotation of the generator armature.

In FIG. 5, a flow regulator pipe 141 is attached near the bottom of the flow riser 81 and communicates with the interior of cylinder 83 by an opening 149. Normally, if flow regulator pipe 141 was open, water would flow through pipe 141 and out of exit end 143. However, a flow regulator control arm 145 is provided to operate an internal valve, such as a butterfly valve (not shown) to control the amount of water that can exit regulator pipe 141. The control link 147 is shown passing through the fixture 163 at a working unit 21 and terminating in a manual flow regulation controller 151 shown in the form of a handle. Thus, by turning handle 151, the flow regulator control arm 145 turns, the valve opens in flow regulator pipe 141, and a regulated amount of water is permitted to exit the flow riser 81.

Flow regulation as just described is highly desirable for optimizing the efficiency of the system. In times of high activity of wave motion, the amount of water that is permitted to be released between waves is great, and rather than to have it overflow through overflow outlet pipe 91 (FIG. 4), more water is let out of flow regulator pipe 141 to permit the cylinder to fall more quickly. Then, in times of quiet seas, the flow regulator control arm 145 can be turned to close off regulator pipe 141 and permit the piston to fall at a normal rate which is due to the passage of only a small amount of water through the flow regulator pipe 141.

Instead of using a manual flow regulation controller 151, a mechanical pressure sensor (not shown) can be installed in flow regulator pipe 141 to automatically release more water as the pressure beneath the piston builds up due to high sea activity. Alternatively, a pressure sensor 157 may be provided to monitor the pressure in cylinder 83 beneath the piston 85. In times of high sea activity, the cylinder will be pushed higher and higher creating a larger pressure sensed by pressure sensor 157. The output of pressure sensor 157 is applied along line 161 to a flow regulator controller 159 which, in turn, outputs an electrical motor drive signal on line 155 to rotate a stepping motor 153, acting on control link 147, thereby performing the function of an automatic flow regulation controller.

Recalling the shaft angular velocity signal on line 164 from FIG. 4, it can be appreciated that a small microprocessor in flow regulator controller 159 can receive pressure information from pressure sensor 157 and angular velocity from magnetic switch 162 and control the amount of flow regulation to pipe 141 to obtain optimum operation which is, in effect, highest pinion shaft rotation velocity without exceeding a maximum pressure beneath piston 85 that would otherwise cause the water to overflow into outlet pipe 91 and be wasted. The details of the operation of flow regulator controller 159 are not given here, since any one skilled in that art can easily combine the two signals without undue experimentation once the need for such a combination to operate a flow regulator is made known.

A transmission for each of the working units to provide driving force to a common drive shaft upon movement of each piston 85 in both the up and down strokes is shown in FIG. 6.

Basically, the transmission 101 comprises a rack 89 having teeth 103 cooperating with a pinion gear 107 having teeth 105 engaged with teeth 103. Pinion gear 107 is the only contact with rack 89 on both the up and down movement thereof. Rack 89, of course, is physically attached to the top of piston 85.

A pinion shaft 109 is rotated by the pinion gear 107 for both up and down movements of the piston 85. An "up" drive gear 111 is fixed to the pinion shaft for rotation therewith, and a first drive shaft gear 119, fixed to the common drive shaft 23 of the electrical generator, is directly rotated by toothed engagement with the "up" drive gear 111 for rotating the drive shaft 23 in a preselected direction (f or h). A first ratchet 115 is coupled between the "up" drive gear 111 and the pinion shaft 109 for turning the "up" drive gear when the rack 89 goes up, and for slipping when the rack 89 goes down.

A "down" drive gear 113 is also fixed to the pinion shaft 109 for rotation therewith. A second drive shaft gear 121 is fixed to the common drive shaft 23 for the electrical generator. A belt-like member 129, preferably a chain, is arranged around the "down" drive gear 113 for rotating the drive shaft gear 121 and thus the drive shaft 23 in the aforementioned preselected direction. A second ratchet 117 is coupled between the "down" gear 113 and the pinion shaft 109 for turning the "down" drive gear 113 when the rack 89 goes down and for slipping when rack 89 goes up.

The design and operation of the ratchets will be best understood by reference to FIGS. 7 and 8. Shown in these figures is an interior sawtoothed ring 131 fixed to the corresponding "up" or "down" drive gear 111, 113 (gear 111 being illustrated as exemplary). A bearing 134 is provided for rotatably mounting the "up" or "down" drive gear 111, 113 on the pinion shaft 109. A pawl wheel 133 is fixed to the pinion shaft 109 and rotatable therewith. A plurality of ratchet pawls 135 are pivotally mounted around the pawl wheel 133 and have pawl points which engage with sawteeth 132 in the sawtoothed ring 131 for turning the sawtoothed ring and the "up" or "down" drive gear 111, 113 when the pinion shaft 109 rotates in one direction, and for slipping the pawl points along the interior of the sawtoothed ring 131 when the pinion shaft 109 rotates in the opposite direction. Springs (not shown) force the pawls 135 toward the engaged position.

The pinion shaft 109 is mounted in bearings 125 in a shaft mounting block 123 at each end thereof. The common drive shaft 23 is likewise mounted in block 123 by means of bearings 127.

In operation, the movement of the rack 89 in either direction causes a positive rotation of drive shaft 23 as will now be described having reference to arrows a–h in FIG. 6. As rack 89 moves downwardly in the direction of arrow a, pinion gear 107 rotates in the direction of arrow c causing pinion shaft 109 to rotate in the same direction as the pinion gear 107. It should be noted that the direction of the points of the pawls of "up" drive gear 111 and "down" drive gear 113 are opposite from one another in FIG. 6. As such, the rotation of pinion gear 107 in the direction of arrow x causes the first ratchet 115 to slip and the second ratchet 117 to have its points engage the sawtoothed surface of the corresponding ring 131 and turn the "down" drive gear 113 in the direction of arrow e. Through the chain 129 action, the second drive shaft gear 121 rotates in the direction of arrow f causing the drive shaft 23 to rotate in the same direction.

On the up stroke of piston 85, the rack 89 moves in the direction of arrow b. Pinion gear 107 then rotates in the direction of arrow d. This turns pinion shaft 109 in the same direction as pinion gear 107 and causes the second ratchet 117 to slip and the first 115 to turn the "up" drive gear 111 in the direction of arrow g. The teeth of gear 111 mesh with the teeth of the first drive shaft gear 119 to directly cause gear 119 to rotate in the direction of arrow h, precisely the same direction as that of arrow f, thereby turning the drive shaft 23 in the same direction for both up and down movements of rack 89.

As explained earlier, it is essential that each water inlet have a check valve in its path toward the main pipeline 29 in order to permit water to flow into the water inlet 31 but not to flow out. FIG. 9 shows a schematic representation of one type of check valve that could be used. Obviously, any of a large number of known check valve types could be incorporated in the invention without departing from the spirit and scope of the invention.

For simplicity, FIG. 9, a view taken along the lines 9—9 in FIG. 10, is drawn schematically (not to scale) and shows a check valve 71 comprised of a plurality of horizontal shutter vanes 75 which can open and close as will be described. FIG. 10 is also referred to in this discussion, such figure showing the end view of the check valve 71 looking down the neck portion 39 of the water inlet 31, and is therefore seen as circular in FIG. 10 as opposed to its actual shape being rather elongated vertically in the form of an oval.

In any event, a number of hinges 72a–72f on one side of a vertical support bar 73 and vanes 75a–75f on the same side of the support bar 73 close naturally by their own weight and come to rest with their ends adjacent the hinge below it. This is seen in FIG. 9(a) quite clearly. Similarly, hinges 72a'–72f' and shutter vanes 75a'–75f' are located on the other side of support bar 73. The bottom vanes 75f and 75f' merely rest on the neck of the inlet. Due to the curved cross section of the check valve 71, it is not possible to make the veins exactly the size of the inner surface of the neck portion 39, and therefore they are narrowed at the top of both left and right sides so as to be able to swing freely in the neck portion 39 to the open position, as shown in FIG. 9(b). To prevent leakage around the sides of the vanes, a rib 74 is secured to the inner lining of the neck portion 39, so that in the closed position, the neck portion 39 is substantially closed off to the passage of water therethrough. The force of the water entering inlet 31 through entrance 33, of course, causes the vanes 75a'–75f' to swing open, and the ribs 74 are designed to be as least restrictive to the flow of water in neck portion 39 as possible.

For the purposes of clean-out on a regular scheduled interval basis, a clean-out means is provided at the remote end of each pipeline assembly 27. This is best seen in FIG. 11 which is a view looking into the end of the pipeline. Here, an end plate 53b is shown hingeable at hinge 50 to an open position which would be out of the paper as seen in FIG. 11. A small hinge support piece 53a can be welded near the end 51 of of pipeline 29 so as not to restrict the water flow as it exits in the clean-out mode.

A plurality of apertures 64 are spaced about and adjacent to the remote end 51 of the main water pipeline 29, and a like plurality of movable pins 56 are mounted on the end plate 53b with one of its ends pivotally connected to a boss 59 and the other of its ends passing through a spring assembly 54. Inside of spring assembly 54 is a compression spring 52 pushing against the spring assembly 54 toward the center of plate 53b and on a collar 56a welded to the pin 56 at the other end of spring 52. In this manner, the action of spring 52, tending to decompress, forces the pins 56 into the apertures 64 to maintain the end plate 53b in a closed condition.

When it is time for clean-out, an electrical signal is applied to line 62 to energize a solenoid 61 mounted by mounting brackets 63 to the outside of the end 51 of pipeline 29. In the center of plate 53b is a hub 57 about which a collar 55 is rotatably mounted. When solenoid 61 is energized, it pushes a push rod 60 pivotally attached at a radius of collar 55 to cause collar 55 to rotate counterclockwise as seen in FIG. 11. This rotation of collar 55, in turn, pulls each pin 56 out of its aperture 64 and permits the end plate 53b to swing open and allow the water in pipeline 29 to discharge through end 51 as prescribed.

To ensure that the end plate 53b is in position before solenoid 61 releases to permit pins 56 to enter apertures 64, a magnet 66a is mounted on end plate 53b, and a magnetic switch 66b is attached to the edge of pipeline end 51. Upon a complete closure of end plate 53b, magnet 66a operates switch 66b, and this condition is transmitted to the working unit 21 where a worker can then remove power from solenoid 61. Alternatively, the output of switch 66b on line 68 can be electrically in series with solenoid 61 input leads 62 so that solenoid 61 automatically releases when end plate 53b is in the fully closed position and switch 66b opens under the influence of magnet 66a.

There may be times when the main water pipeline has a pocket or pockets of air therein. In practice, the forces of the water involved are such that most trapped air would be dissolved in the water. For precaution, however, a small air vent hole 69 is provided in the hinge support 53a. Then, if the entire pipeline is raised by, for example, one foot at its end 51 relative to the end near the shore, any trapped air, being lighter than water, would eventually find its way out air vent hole 69.

After about one month of operation, the main pipeline 29 should be flushed out as previously indicated. Because the present invention uses an electronic solenoid 61 and magnetic switch 66a, 66b, the flushing of the system can be accomplished by setting an automatic timer. This process should be done preferably after an incoming wave has passed the most inward water inlet 31 and most of the pressure under the piston 85 is relieved through the flow regulator pipe 141 which should be opened to its maximum extent. The system is designed to maintain a large amount of water beneath the piston under these conditions. Accordingly, the pressure in the pipeline 29 would still be greater than that outside the pipeline, and such pressure will cause the water to flush out of the end 51 of pipeline 29 and carry with it any debris or contaminants. After the pressure inside of pipeline 29 equalizes with that outside the pipeline, the end plate 53b will fall due to gravity, the magnetic switch 66a, 66b will activate, and the solenoid 61 will be manually or automatically deactivated to permit springs 52 to again seat the ends of pins 56 in aperture 64. Of course, if desired, solenoid 61 could be selected as a push-pull solenoid to both push the pins into apertures 64 and remove them from apertures 64 at the appropriate time.

After one pipeline assembly 27 is flushed out, the next adjacent pipeline assembly 27 is then flushed out. It is important to not flush out more than one pipeline assembly at a time so that all pipeline assemblies not being flushed out will have some operative contribution to the production of output energy.

FIG. 12 shows a cross-sectional view of the gas vent valve 88 which is connected to aperture 92 and the cylinder 85 and which exits through a vent hole 86. In the gas vent valve 88, a cylindrical opening 94 contains a plastic, metal, or rubber ball 95. A pair of seats 96, 97 are positioned above and below the ball 95, respectively. This type of valve serves two purposes. First, when air is in the pipeline 29, the pressure of an incoming wave will tend to force any air trapped below cylinder 85 to flow upwardly through aperture 92 causing the ball 95 to leave its seat 97 to some extent. The air will then pass by the periphery of the ball and out the vent hole 86 at the top. Then when all of the air has been exhausted, the pressure of water beneath the piston will cause water to flow up through aperture 92 and force ball 95 against the upper seat 96 due to the increased density of the water as compared with air. This action will prevent any water from being lost through the top of the vent 88. Secondly, on the downward stroke of the piston 85, the water beneath the piston is draining out of the flow regulator pipe 141 tending to draw air from gas vent valve 86 past the ball 95 and through aperture 92 downwardly. However, the pulling of the water beneath the cylinder 85 creates a vacuum for the pulling ball 95 against the bottom seat 97 to prevent this from happening.

Because the invention will be used primarily in a salt water environment, it is recommended that plastic pipe and fittings be used instead of metal wherever possible. Plastic is also recommended over cement.

The 45-degree/50-degree elbow which joins the neck portion 39 to pipeline 29 can be cast into a ten-foot length of pipeline at the factory. This would space the water inlets at ten foot increments along the pipeline 29.

Most of the drawings have been prepared to show the function of the invention, and it is presumed that one skilled in the art of manufacturing and installing large pipe works would understand that appropriate flanges and couplings would be used as needed. Preferably, all joints are to be connected with nuts and bolts made of stainless steel. The shutter vanes 75 may be made of durable plastic. The hinges, however, should be stainless steel. The seals 87 are preferably plastic/neoprene rubber. The check valves 71 may be installed in the water inlets 31 or in the neck portions 39 connected to the main water pipeline. Such installation, of course, should be completed before joining the piping together. Finally, the pipeline assemblies 27 are to be laid out in a protected bed of washed sand if feasible.

It is to be understood that the invention is not limited to any specific dimensions given in this description. However, an approximation of the amount of energy that can be recovered from the invention can be appreciated by the fact that the piston and the water in the pump beneath the piston weights about 23.5 tons and is pulling a gear that is driving the drive shaft 23 for as long as five minutes or more on descent of the piston, depending upon the amount of water exiting the flow regulator pipe 141. The total weight of four of the working units 21 calculates to 94 tons of weight acting to push up and pull down the piston 85. Depending upon the natural frequency and spacing of waves in the location of the system, the pipeline assemblies 27 can be beneficially arranged such that a group of four assemblies 27 may be receiving wave motion delayed some time after the first group of four pipeline assemblies 27 receives wave motion. Thus, when the first group of units received water to push up the respective cylinders, the second group starts their downpull of the pistons so that the maximum tonnage of water acting on the system would be about 188 tons. In the ideal situation, then, approximately 188 tons of weight are pushing up and pulling down the cylinder to drive the generator drive shaft in a substantially continuous manner. The formula used to determine the weight of the piston and water is $3.14 \times radius^2 \times height \times 8$ lbs/gallon $\times 7.5$ gallons/cu. ft., assuming the bottom of the cylinder is ten feet above sea land, and the radius of the cylinder is 5 feet.

For servicing the flow riser 81, for example when changing seals 87 around the piston 85, it will be necessary to raise the piston higher than the highest point it reaches during operation. This is typically some distance above the overflow opening 90, and is preferably about two times the distance between the top of the piston and the bottom of the flow riser 81.

While the invention has been described in terms of its preferred embodiment, it should be understood that numerous modifications may be made to the invention without departing from the spirit and scope thereof as defined in the appended claims.

I claim:

1. An apparatus for converting the energy exhibited by the propagation of wave motion in a body of water to alternative forms of energy, comprising:

a main water pipeline disposed below the surface of a body of water;

water inlet means, having a plurality of water inlet positions along a path in the direction of propagation of wave motion, for initially, upon installation of said apparatus, directing water into said main water pipeline from said water inlet positions until a natural equilibrium of water pressure exists inside and outside said main water pipeline, and for directing water into said main water piepline from said plurality of water inlet positions when a wave crest is present above said water inlet means due to the positive pressure of water outside said water pipeline relative to the pressure of water inside said water pipeline, said water inlet means including means for preventing water from exiting said water pipeline when a wave trough is present above said water pipeline due to the negative pressure of water outside said water pipeline relative to the pressure of water inside said water pipeline;

a vertical water flow riser connected to, and receiving water from, one end of said main water pipeline, said flow riser comprising walls defining a cylinder and a piston, in sealing engagement with said cylinder, movable upwardly in said cylinder responsive to the positive pressure of incoming water beneath said piston, and movable downwardly in said cylinder under the influence of the sum of forces due to gravity acting on said cylinder and gravity acting on the water in said cylinder beneath said piston;

drain means for allowing a prescribed amount of water to drain from said main pipeline on the downward stroke of said piston, thereby controlling the rate of downward movement of said piston; and energy conversion means coupled to said piston for producing an alternate energy output.

2. The apparatus as claimed in claim 1, wherein said water inlet means faces a direction opposite to that of the propagation of wave motion and comprises;

a plurality of enlarged water entrances, one at each of said positions along said path, each of said enlarged water entrances having an opening larger in area than the cross sectional area of said main water pipeline; and an inlet neck portion, said enlarged water entrances gradually narrowing to define said inlet neck portion having a cross sectional area substantially the same as said main water pipeline and connected to said main water pipeline in fluid communication therewith.

3. The apparatus as claimed in claim 2, wherein said water inlet means comprises a check valve for permitting water to enter said enlarged water entrance and be communicated to said main water pipeline, and for checking water which tends to flow from said main water pipeline toward said enlarged water entrance.

4. The apparatus as claimed in claim 3, wherein said positions are spaced along said path such that, in response to the propagation of a wave, the increased pressure of water at the entrance of one of said inlet means located under the propagating wave is effective to force open the corresponding one of said check valves due to the pressure at such entrance being greater than the pressure in said main water pipeline, and the resulting increased pressure in said main water pipeline, relative to the lesser pressure at the water entrances of all other water inlet means, is effective to close all other check valves.

5. The apparatus as claimed in claim 3, wherein said check valve comprises:

hinge means positioned in said neck portion of said water inlet means and connected to said neck portion;

flapper means connected to said hinge means and closing said neck portion under the influence of gravity, said hinge means arranged to permit said flapper means to swing open under the influence of water pressure outside said inlet means being greater than the water pressure inside said main water pipeline; and means for preventing said flapper means to swing open under the influence of water pressure in said main water pipeline being greater than the water pressure outside said inlet means.

6. The apparatus as claimed in claim 5, wherein:

said hinge means comprises a plurality of horizontal hinges spanning across the opening of said neck portion;

said flapper means comprises a plurality of shutter vanes one attached to each of said hinges; and said means for preventing said flapper means to swing open comprises a ridge means lining the interior of said neck portion, against which said shutter vanes come to rest when said flapper means closes said neck portion.

7. The apparatus as claimed in claim 1, wherein:
said main water pipeline has a shore end near the shore of the body of water, and a sea end remote from the shore; and
said drain means further comprises a flow regulator at said shore end, and beneath said piston, for permitting a controlled amount of water to exit said vertical water flow riser, on the downward stroke of said piston.

8. The apparatus as claimed in claim 7, comprising:
a pressure sensor for sensing the pressure inside said flow riser beneath said piston and producing an electrical output signal representative of said pressure;
a flow regulator controller for receiving said electrical output signal and automatically operating said flow regulator to maintain a prescribed average pressure in said flow riser by controlling the amount of water exiting said vertical water flow riser on the downward stroke of said piston.

9. The apparatus as claimed in claim 8, comprising:
a rotatable drive shaft;
transmission means coupled to said piston for converting the up and down movement of said piston to the rotation of said drive shaft; and
means for sensing the angular velocity of said drive shaft and providing an output electrical signal representative thereof; and wherein
said flow regulator controller receives said output electrical signal representing said angular velocity and automatically adjusts said flow regulator to produce optimum angular velocity of said drive shaft.

10. The apparatus as claimed in claim 1, comprising an overflow outlet in the side of said vertical flow riser above a level the water beneath said piston would reach during normal operation of the apparatus, thereby discharging water beneath said piston when the bottom of said piston rises above said level due to excessively high waves or tidal conditions.

11. The apparatus as claimed in claim 1, comprising:
a rotatable drive shaft;
transmission means coupled to said piston for converting the up and down movement of said piston to the rotation of said drive shaft; and
electrical generating means for producing electricity from the rotation of said drive shaft.

12. The apparatus as claimed in claim 1, comprising:
a common rotatable drive shaft;
a plurality of said water inlet means;
a like plurality of said vertical water flow risers;
a like plurality of said drain means; and
a like plurality of transmission means each coupled to a corresponding flow riser piston for converting the up and down movement of each of said pistons to the rotation of a said drive shaft; and wherein
said drive shaft is connected to said energy conversion means as an input driving source.

13. The apparatus as claimed in claim 1, comprising a rotatable drive shaft, and transmission means coupled to said piston for converting the up and down movement of said piston to the rotation of said drive shaft, said transmission comprising:
a rack and pinion arrangement, said rack having one end thereof connected to said piston for linear movement of said rack up and down vertically;
a pinion shaft rotatable by said pinion during both up and down movements of said piston;
an "up" drive gear fixed to said pinion shaft for rotation therewith;
a first drive shaft gear fixed to said drive shaft and directly rotated by toothed engagement with said "up" drive gear for rotating said drive shaft in a preselected direction;
a first ratchet coupled between said "up" drive gear and said pinion shaft for turning said "up" drive gear when said rack goes up and for slipping when said rack goes down;
a "down" drive gear fixed to said pinion shaft for rotation therewith;
a second drive shaft gear fixed to said drive shaft;
a belt-like member arranged around said "down" drive gear and said second drive shaft gear for rotating said drive shaft in said preselected direction; and
a second ratchet coupled between said "down" gear and said pinion shaft for turning said "down" drive gear when said rack goes down and for slipping when said rack goes up.

14. The apparatus as claimed in claim 13, wherein each of said ratchets comprises:
an interior sawtoothed ring fixed to the corresponding "up" or "down" drive gear;
a bearing for rotatably mounting said "up" or "down" drive gear on said pinion shaft;
a pawl wheel fixed to said pinion shaft and rotatable therewith; and
a plurality of pawls pivotally mounted around said pawl wheel and having pawl points which engage with said sawtoothed ring for turning said sawtoothed ring and said "up" or "down" drive gear when said pinion shaft rotates in one direction, and for slipping said pawl points along the interior of said sawtoothed ring when said pinion shaft rotates in the opposite direction.

15. The apparatus as claimed in claim 1, including a clean-out means comprising:
an end plate covering the end of said main water pipeline remote from said flow riser;
a hinge for allowing said end plate to swing from a closed position to an open position;
means defining a plurality of apertures spaced about and adjacent to said remote end of said main water pipeline;
a plurality of movable pins mounted on said end plate;
means for urging the ends of said pins to enter said apertures to secure said end plate in said closed position; and
means for selectively releasing said pins from said apertures to free said end plate to swing to an open position.

16. The apparatus as claimed in claim 15, wherein said clean-out means further comprises:
magnet means mounted at the end of said main water pipeline; and
a magnetic switch mounted on said end plate and positioned immediately adjacent said magnet means when said end plate is in the closed position, said magnetic switch means providing a first electrical characteristic in response to said end plate being closed and said magnet means being immediately adjacent said magnetic switch, and providing a second electrical characteristic, different from the first, in response to said end plate being moved away from said closed position.

17. The apparatus as claimed in claim 16, wherein said means for urging comprises a compression spring for each pin, one end of which is fixed relative to said end plate, the other end engageable with said pin for urging it into its corresponding aperture.

18. The apparatus as claimed in claim 15, wherein said means for releasing said pins comprises:
   a hub fixed to the center of said end plate;
   a collar rotatably mounted on said hub; and
   a solenoid and a push rod, said push rod having one end pivotally mounted on said collar near the periphery thereof, the other end of said push rod being acted upon by said solenoid;
   means for pivotally mounting the ends of said pins, which are remote from said ends being urged in said apertures, to the periphery of said collar at spaced locations thereon; whereby
   upon actuation of said solenoid, said push rod rotates said collar and, in turn, pulls said pins away from said apertures, and upon deactivation of said solenoid, said means for urging moves said pins into said apertures.

19. An apparatus for converting the energy exhibited by the propagation of wave motion in a body of water to alternate forms of energy, comprising:
   a main water pipeline;
   water inlet means for permitting water to enter into but not exit said main water pipeline under the influence of wave motion in said body of water;
   a vertical water flow riser connected to, and receiving water from, one end of said main water pipeline, said flow riser comprising walls defining a cylinder and a piston movable upwardly in said cylinder responsive to the positive pressure of incoming water beneath said piston, and movable downwardly in said cylinder under the influence of the sum of forces due to gravity acting on said cylinder and gravity acting on the water in said cylinder beneath said piston;
   drain means for allowing a prescribed amount of water to drain from said main pipeline on the downward stroke of said piston, thereby controlling the rate of downward movement of said piston; and
   energy conversion means coupled to said piston for producing an alternative energy output.

20. The apparatus as claimed in claim 19, wherein said drain means comprises a flow regulator for permitting a controlled amount of water to exit said vertical water flow riser on the downward stroke of said piston.

* * * * *